Figure 1:
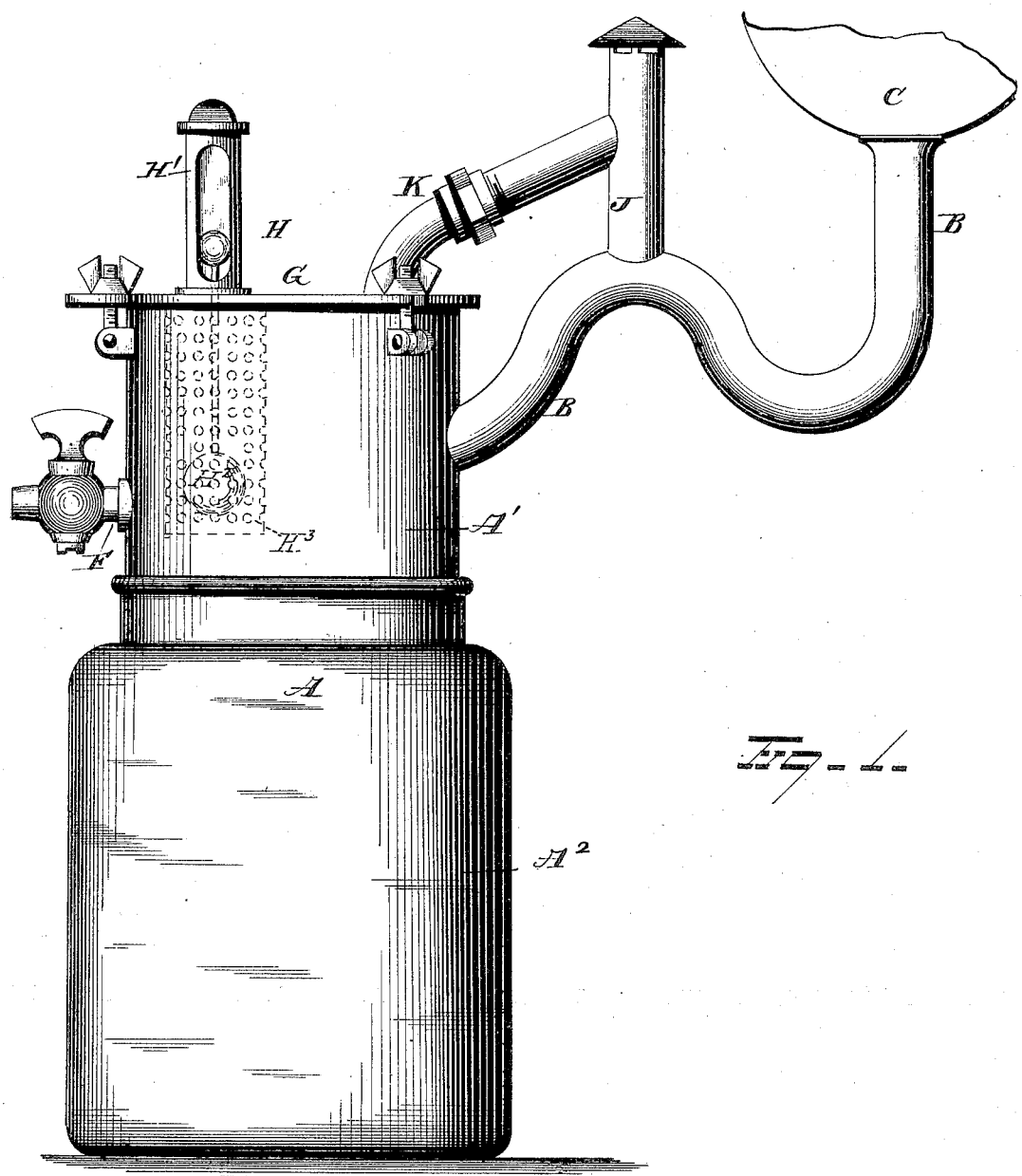

(No Model.) 2 Sheets—Sheet 1.

J. L. ROXBURGH & W. GLOVER.
WATER CLOSET.

No. 302,592. Patented July 29, 1884.

WITNESSES
S. G. Nottingham
George Cook

INVENTOR
J. L. Roxburgh
William Glover
B. F. Hasymon, Attorney

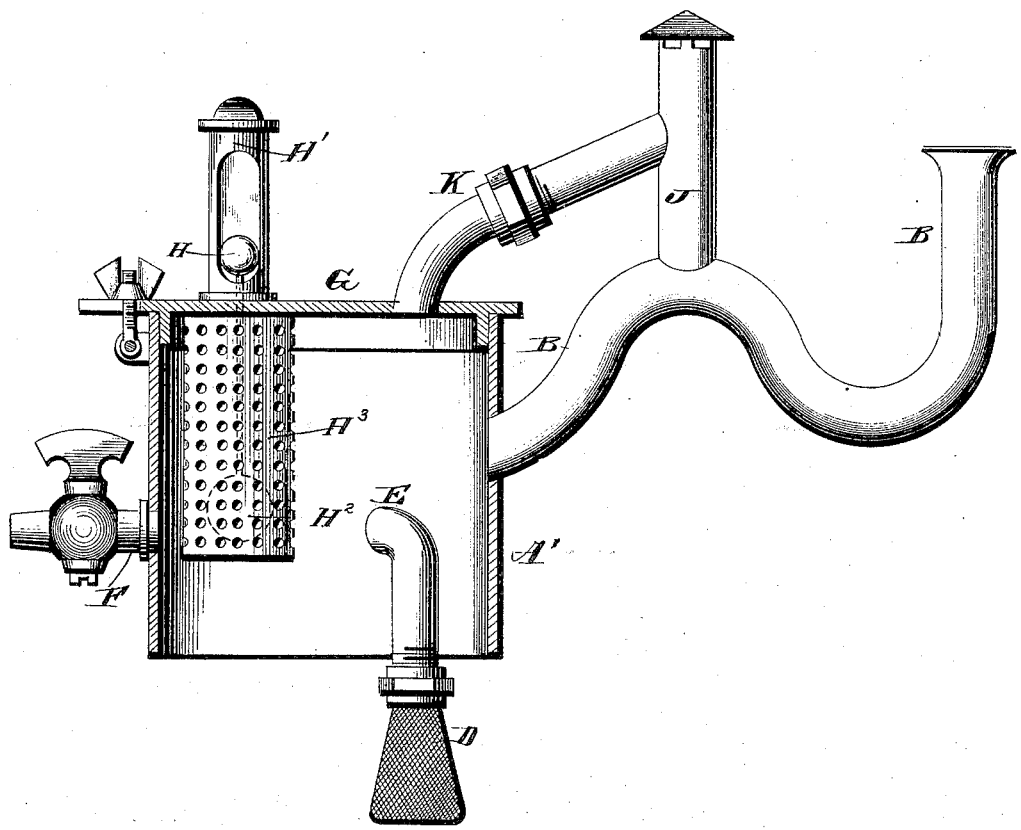

UNITED STATES PATENT OFFICE.

JAMES LAUGHLAND ROXBURGH AND WILSON GLOVER, OF CHARLESTON, SOUTH CAROLINA.

WATER-CLOSET.

SPECIFICATION forming part of Letters Patent No. 302,592, dated July 29, 1884.

Application filed June 28, 1883. (No model.)

*To all whom it may concern:*

Be it known that we, JAMES L. ROXBURGH and WILSON GLOVER, of Charleston, in the county of Charleston and State of South Carolina, have invented certain new and useful Improvements in Water-Closets; and we do hereby declare the following to be a full, clear, and exact description of the invention, such as will enable others skilled in the art to which it appertains to make and use the same.

Our invention relates to an improvement in water-closets, the object of the same being to provide a device which shall prevent the passage of solid matter into sewers, and its consequent transmission into rivers, &c.; and with this object in view our invention consists in certain details of construction and combinations of parts, as will be hereinafter described, and pointed out in the claims.

In the accompanying drawings, Figure 1 is a view in side elevation of our improvement. Fig. 2 is a vertical section of the upper portion of the receptacle and its attachments.

A represents a glazed earthen jar or other suitable receptacle, placed in a suitable position on or under ground. We prefer to construct this receptacle of a lower section, $A^2$, and an upper section, $A'$, the open lower end of which fits snugly within the mouth of said lower section, and to the wall of the upper section is connected the soil-pipe B from the closet C. The upper section of the jar is also provided with an eduction-pipe, E, to allow of the passage of liquid therefrom into the sewer, the said pipe E being provided on the lower inner end with a strainer, D, to prevent the escape of solid matter into the pipe. This strainer is placed below the water-line in the jar, thereby effectually excluding the sewer-gas from the closet and house. On the opposite side of the receptacle A, and connected thereto, is the eduction-pipe F, adapted to be opened and closed by a valve, the function of which pipe is to relieve the jar in case its solid contents should rise above the water-level or pipe E.

The receptacle A is provided with a removable cover, G, which, when in position on the receptacle, is air-tight. This cover is provided with an air-tight indicator-tube, $H'$, the upper portion of which is transparent, in which tube rests and moves the indicator H, the lower end of which is provided with a suitable float, $H^2$, inclosed in a vessel, $H^3$, depending from the cover. The side and bottom walls of this vessel $H^3$ are perforated, as shown, so that liquid may be freely admitted therein to operate the float and its indicator, but to exclude all solid matter which might interfere with the proper operation of said float. This indicator is adapted to float on the water-level and indicate by its rise in the tube when the solid matter in the receptacle has risen above this level. When such occurs, the cover G is removed, and the receptacle delivered of its contents by pneumatic or hydraulic excavating apparatus; or, if desired, the same may be accomplished by connecting suction to the pipe F.

The receptacle A is ventilated by means of the sectional pipe K, attached to the cover G, to the end of which pipe is connected the pipe J, leading from the soil-pipe B.

It is evident that slight changes in the construction and relative arrangement of the several parts might be resorted to without departing from the spirit of our invention; and hence we would have it understood that we do not limit ourselves to the exact construction shown and described, but consider ourselves at liberty to make such changes as fairly fall within the spirit and scope of our invention.

Having fully described our invention, what we claim as new, and desire to secure by Letters Patent, is—

1. The combination, with a suitable impervious receptacle, of a soil-pipe leading into said receptacle, an eduction-pipe provided at its inner end with a strainer, and a separate eduction-pipe normally closed by a valve, substantially as set forth.

2. The combination, with a suitable receptacle provided with a removable cover, of a soil-pipe leading into said receptacle, an eduction-pipe having a downwardly-projecting inner end, a strainer fitted to the end of said pipe, and a separate eduction-pipe normally closed by a valve, substantially as set forth.

3. The combination, with a suitable receptacle provided with a removable cover, and having a soil-pipe and independent eduction-pipes communicating therewith, of the indicator-tube transparent at its upper end, and the float, substantially as set forth.

4. The combination, with a suitable receptacle having a soil-pipe and independent eduction-pipes communicating therewith, of the removable cover, the indicator-tube secured to said cover and provided with a transparent side, and the float, the upper end of the stem of which terminates within the indicator-tube, substantially as set forth.

5. The combination, with a suitable receptacle having a soil-pipe and independent eduction-pipes communicating therewith, of the removable cover, the indicator-tube and perforated vessel secured to opposite sides thereof, and the float arranged within said vessel, and having its stem extend to the interior of the tube, substantially as set forth.

In testimony whereof we have signed this specification in the presence of two subscribing witnesses.

JAMES LAUGHLAND ROXBURGH.
WILSON GLOVER.

Witnesses:
E. A. BALAGUER,
F. C. BLACK.